United States Patent
Thubert et al.

(10) Patent No.: US 7,209,978 B2
(45) Date of Patent: Apr. 24, 2007

(54) ARRANGEMENT IN A ROUTER OF A MOBILE NETWORK FOR OPTIMIZING USE OF MESSAGES CARRYING REVERSE ROUTING HEADERS

(75) Inventors: Pascal Thubert, La Colle sur Loup (FR); Marco Molteni, Antibes (FR); Patrick Wetterwald, Cagnes sur Mer (FR); David Auerbach, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 882 days.

(21) Appl. No.: 10/318,179

(22) Filed: Dec. 13, 2002

(65) Prior Publication Data

US 2004/0117339 A1  Jun. 17, 2004

(51) Int. Cl.
G06F 15/173 (2006.01)
G06F 17/30 (2006.01)

(52) U.S. Cl. .......................................... 709/242; 707/1
(58) Field of Classification Search ................ 709/242; 707/1
See application file for complete search history.

(56) References Cited

U.S. PATENT DOCUMENTS

2004/0032852 A1   2/2004   Thubert et al.

OTHER PUBLICATIONS

Chao, Han-Chieh, An Overview and Analysis of Mobile Internet Protocols in Cellular Environments, Internet Research: Electronic Networking Applications and Policy, vol. 11. No. 5. 2001, pp. 435-450.*

Perkins, Charles E., Mobile IPv6 & Cellular Telephony, Nokia Research Center, http://www.iprg.nokia.com/~charliep, pp. 1-28.*

Kessler, Gary C, Future Mobility, Telephony; Sep. 21, 1998, pp. 48, 50, and 52.*

Orubeondo Ana, Mobile IP will Fuel Mobile Computing Boom, InfoWorld, Feb. 28, 2000, pp. 41-42 and 45.*

Thubert et al., "IPv6 Reverse Routing Header and Its application to Mobile Networks", IETF Network Working Group, Internet Draft, draft-thubert-nemo-reverse-routing-header-00, Jun. 19, 2002.

Kniveton et al., "Mobile Router Tunneling Protocol", NEMO Working Group, Internet Draft, draft-kniveton-mobrtr-03.txt, Nov. 1, 2002.

(Continued)

Primary Examiner—Zarni Maung
Assistant Examiner—Saket Daftuar
(74) Attorney, Agent, or Firm—Leon R. Turkevich

(57) ABSTRACT

A mobile router is configured for optimized utilization of reverse routing headers, to specify a path between an originating mobile router and a home agent. Reverse routing headers enable each mobile router within the path to the home agent to specify its care of address, enabling the home agent to establish a bidirectional tunnel to the originating mobile router via the corresponding mobile router. The mobile router selectively updates the reverse routing header in a received packet by inserting the source address value of the received packet into the reverse routing header and inserting its corresponding care of address into the source address field, based on whether the mobile router lacks a routing table entry that specifies reachability of a most recent entry in the reverse routing header via the source address value. The mobile router also may request the originating mobile router to increase the reverse routing header size.

36 Claims, 6 Drawing Sheets

OTHER PUBLICATIONS

Ernst et al., "Network Mobility Support Terminology", Internet Engineering Task Force (IETF), Internet Draft, draft-ernst-monet-terminology-01.txt, Jul. 2002.

Baker, "An outsider's view of MANET", Network Working Group, Internet Draft, draft-baker-manet-review-01, Mar. 17, 2002.

Johnson et al., "Mobility Support in IPv6", IETF Mobile IP Working Group, Internet Draft, draft-ietf-mobileip-ipv6-18.txt, Jun. 1, 2002.

Kniveton et al, "Mobile Router Tunneling Protocol", NEMO Working Group, Internet Draft, draft-kniveton-mobrtr-03.txt, Nov. 1, 2002.

Thubert et al., "IPv6 Reverse Routing Header and Its application to Mobile Networks", Network Working Group, Internet Draft, draft-thubert-nemo-reverse-routing-header-00, Jun. 19, 2002.

Thubert et al., "IPv6 Reverse Routing Header and its application to Mobile Networks", Network Working Group, Internet Draft, draft-thubert-nemo-reverse-routing-header-01,Oct. 11, 2002.

Hinden et al, "IP Version 6 Addressing Architecture", Network Group, Request for Comments: 2373, Jul. 1998, pp. 1-26.

* cited by examiner

ARRANGEMENT IN A ROUTER OF A MOBILE NETWORK FOR OPTIMIZING USE OF MESSAGES CARRYING REVERSE ROUTING HEADERS

BACKGROUND OF THE INVENTION

1. Field of the Invention

The present invention relates to management of a mobile network by mobile routers, where the mobile network is capable of changing its point of attachment to a wide area network (e.g., the Internet) and thus its reachability in its associated topology.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. For example, the IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, available on the World Wide Web at the Network Mobility Home Page at the address "nal.motlabs.com/monet" on the World Wide Web. One exemplary Internet Draft by Thierry Ernst, entitled "Network Mobility Support Terminology", February 2002, is available on the World Wide Web at the address "nal.motlabs.com/monet/drafts/draft-ernst-monet-terminology-01.txt".

For example, Ernst describes an exemplary mobile network that can be deployed within an airplane, where passengers establish an IP connection of their respective IP host devices (e.g., laptop, digital telephone, personal digital assistant, etc.) to a mobile router within the airplane for on-board Internet access; during the flight, the mobile router within the aircraft may change its point of attachment to the Internet via distinct Internet Service Providers (ISPs), for example by changing connections via respective radio links or geostationary satellite links for transoceanic flights. Note that a passenger also may have his or her own network (i.e., a personal area network) within the mobile network.

According to the NEMO group, a mobile network may be composed by one or more IP subnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN)(nodes unable to change their point of attachment while maintaining ongoing sessions), local mobile nodes (LMN)(mobile nodes that belong to the mobile network and able to change their point of attachment within the mobile network or outside the mobile network), and visiting mobile nodes (VMN)(mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router of a wide area network, such as the Internet, providing connectivity for the mobile network to the wide area network. The mobile router thus serves as a gateway to route packets between the mobile network and the Internet.

The IETF also has a Mobile Ad-hoc Networks (MANET) Working Group that is working to develop standardized MANET routing specification(s) for adoption, by the IETF. According to the MANET Working Group, the "mobile ad hoc network" (MANET) is an autonomous system of mobile routers (and associated hosts) connected by wireless links— the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET", available from the IETF on the World Wide Web at the address "ietf.org/internet-drafts/draft-baker-manet-review-01.txt", the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

A "Mobile IPv6" protocol is disclosed in an Internet Draft by Johnson et al., entitled "Mobility Support in IPv6", available on the World Wide Web at the address "ietf.org/internet-drafts/draft-ietf-mobileip-ipv6-18.txt". According to Johnson et al., the Mobile IPv6 protocol enables a mobile node to move from one link to another without changing the mobile node's IP address. Hence, a mobile node is always addressable by its "home address", an IP address assigned to the mobile node within its home subnet prefix on its home link. Packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

A particular concern arises where a mobile network has a nested mobile network topology, where multiple mobile routers are recursively connected. FIG. 1A is a diagram illustrating a nested mobile network 10 having mobile routers 12a, 12b, 12c, 12d, 12e and 12f having nested attachments, enabling a local fixed node (e.g., LFN1) 14 to communicate with a correspondent node 16 via a wide area packet switched network, such as the Internet 18. Packets sent by the local fixed node 14 for the correspondent node 16 are received by the mobile router 12c; the mobile router 12c adds an IPv6 header having a source address specifying the home address of the mobile router 12c, and a destination address specifying the correspondent node 16. The path for the packets from the mobile router 12c to the Internet 18 is MR3 12c, to MR2 12b, to MR1 12a, to the Internet 18 via an access router 22.

As illustrated in FIG. 1A, the mobile router 12c has an associated home agent 20 for forwarding packets specifying the home address of the mobile router 12c as the destination address. The home agent 20, upon receiving the packets specifying the home address of the mobile router 12c, forwards the packets to the care of address registered for the mobile router 12c. the local fixed node 14. Although not shown, the mobile routers 12a and 12b would also have respective home agents.

FIG. 1B is a diagram illustrating bidirectional nested tunnels 22a, 22b, and 22c implemented by the mobile routers 12a, 12b and 12 for communications between the local fixed node 14 and the correspondent at 16. In particular, the Internet draft by Kniveton, T., entitled "Mobile Router Support with Mobile IP", available on the on the World Wide Web at the address "ietf.org/internet-drafts/draft-kniveton-mobrtr-03.txt", suggests a tunnel-within-tunnel approach as illustrated in FIG. 1B. Hence, according to Kniveton, communications between the local fixed node 14 and the correspondent node 16 would implemented by the mobile routers 12a, 12b, and 12c and the respective home agent 20a, 20b, and 20c based on bidirectional tunnels (e.g., 22a) between the mobile router (e.g., 12a) and the corresponding home agent (e.g. 20a).

The nested bidirectional tunnels 22a, 22b, and 22c may lead to very inefficient "pinball routing" in the infrastructure of the Internet 18, depending on the relative locations of the home agents 20a, 20b and 20c.

SUMMARY OF THE INVENTION

There is a need for an arrangement that enables communications between a nested mobile network node and a correspondent node to be implemented with a minimal number of hops between the nested mobile network node and the correspondent node.

There also is a need for arrangement that enables communications between a nested mobile network node and a correspondent node to be implemented using a single bidirectional tunnel, while minimizing increases in packet header sizes.

These and other needs are attained by the present invention, where a mobile router is configured for optimized utilization of reverse routing headers that are used to specify a path between an originating mobile router and a corresponding home agent. Reverse routing headers enable each mobile router within the path to the home agent to specify its corresponding care of address, enabling the home agent to establish a bidirectional tunnel to the originating mobile router via the corresponding mobile router. The mobile router selectively updates the reverse routing header in a received packet by inserting the source address value of the received packet into the reverse routing header and inserting its corresponding care of address into the source address field, based on whether the mobile router lacks a routing table entry that specifies reachability of a most recent entry in the reverse routing header via the source address value. If the mobile router determines that the reverse routing header has insufficient space for insertion of the source address value, the mobile router may send a message to the originating mobile router to increase the size of the reverse routing header. The originating mobile router also can be configured for sending the reverse routing header at selected instances based on determined stability characteristics in the connection between the originating mobile router and the destination home agent.

Hence, use of reverse routing headers can be optimized to minimize increased data traffic and to ensure reverse routing headers are configured to minimize empty slots.

One aspect of the present invention provides a method in a mobile router of a mobile network. The method includes receiving a packet having a source address field with a source address value specifying a source of the packet, a destination address field with a destination address value specifying a home agent for an originating mobile router, and a reverse routing header configured for storing addresses. The reverse routing header has at least a first entry that specifies a care of address for the originating mobile router. The method also includes selectively updating the reverse routing header by inserting the source address value into a detected empty entry field of the reverse routing header, based on a determined absence of a routing table entry that specifies reachability of an identified entry within the reverse routing header via the source address value. The packet is output to an identified router, including inserting a care of address for the mobile router into the source address field.

Another aspect of the present invention provides a method in a mobile router, the method including attaching to a default router based on a corresponding received router advertisement message having a tree information option field having attributes specifying a network topology model of the corresponding router. The method also includes an IPv6 based reverse routing header. The IPv6 based reverse routing header has a home address field specifying a corresponding prescribed home address for the mobile router identifiable by a prescribed home agent, and a selected number of empty address slots enabling storage of respective care-of addresses of routers between the mobile router and the prescribed home agent. The selected number is determined at least based on the network topology model. The method also includes generating an outer IPv6 header having a source address field specifying the care-of address of the mobile router and a destination address field specifying an address of the prescribed home agent, and outputting a packet, including at least the outer IPv6 header and selectively including the IPv6 based reverse routing header, to the default router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1A:
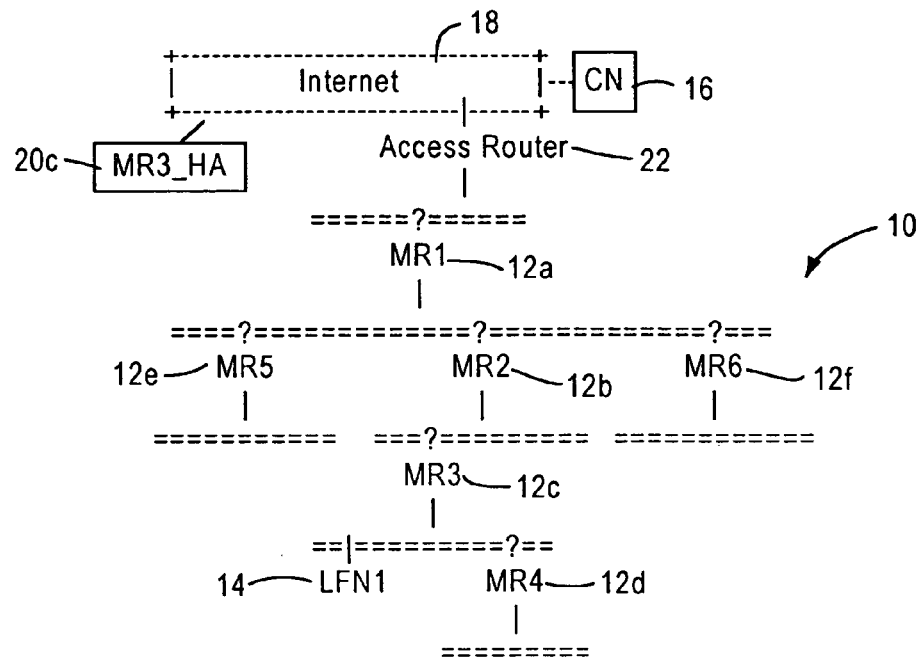
FIGS. 1A and 1B are diagrams illustrating a prior known (PRIOR ART) mobile network and a tunnel-within-tunnel method of sending a packet between an end node in the mobile network and a correspondent node, respectively.
Figure 1B:
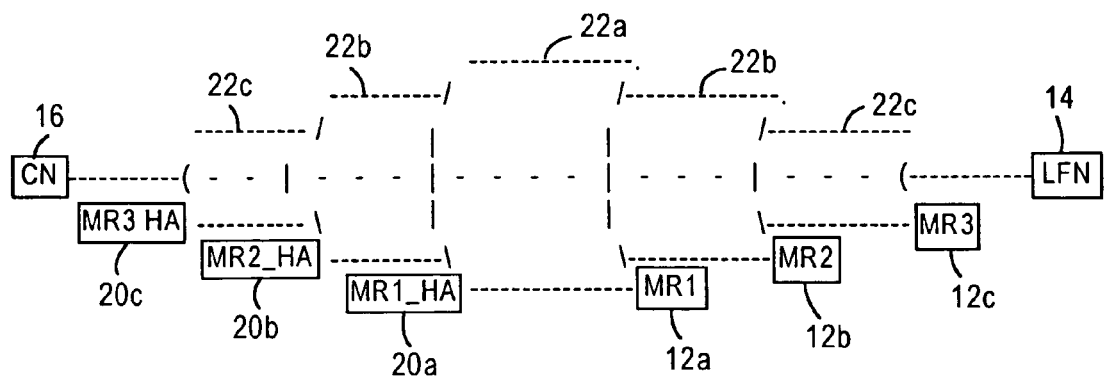

The disclosed embodiment is directed to optimizing generation and use of IPv6 based reverse routing headers in a mobile network. The basic generation and use was published on Jun. 19, 2002 by the inventors as an Internet Draft, "IPv6 Reverse Routing Header and its application to Mobile Networks" available on the World Wide Web at "ietf.org/internet-drafts/draft-thubert-nemo-reverse-routing-header-00.txt" and is incorporated in its entirety herein by reference. A more recent version was published Oct. 11, 2002, available on the World Wide Web at "ietf.org/internet-drafts/draft-thubert-nemo-reverse-routing-header-01.txt" and incorporated in its entirety herein by reference.

The disclosed embodiment optimizes on the generation of reverse routing headers by originating mobile routers, by selecting a number of empty address slots to be used for storage of care-of addresses by routers between the originating mobile router and the home agent of the mobile router. As described below, the originating mobile router initially selects the number of empty address slots based on attaching to a router based on a received router advertisement message having a tree information option that specifies attributes, including the number of hops (i.e., depth) within the tree (i.e., the network topology model). The originating mobile router, upon sending a bind update message to its home agent, can confirm the number of necessary empty slots based on the routing header within a bind acknowledgement message received from the home agent. In addition, the originating mobile router may adjust the number of empty slots based on receiving an Internet Control Message Protocol (ICMP) message from a router between the originating mobile router and the home agent; in this case, the intervening router sends the ICMP message in response to detecting an insufficient number of empty slots for inserting its care-of address, described below.

The originating mobile router also minimizes use of the reverse routing header ("type 4 header") to save bandwidth and processing resources in the intermediate routers, and does not send a reverse routing header unless there is a detected change in network topology, or an inactivity timer expires indicating a possible failure in the communication path between the originating mobile router and the home agent. In such cases where the reverse routing header is not needed, the originating mobile router instead sends a truncated routing header ("type 3"), described below.

Use of the reverse routing header also is optimized by intervening routers receiving a packet having the reverse routing header. As described below, an intervening router uses a prescribed routing protocol to determine the mobile routers that are reachable within its network topology model (i.e., the routers that are below it in the tree), and stores the routing information in routing table entries.

If, in response to receiving a packet having a reverse routing header, the mobile router determines the presence of a routing table entry that specifies reachability of an entry in the reverse routing header via the source address of the packet, then further updating of the reverse routing header is unnecessary. Since further updating of the reverse routing header is unnecessary, the mobile router merely updates the source address field with its own care-of address and forwards the packet up the tree. Hence, the size of the reverse routing header is minimized.

However if the mobile router determines an absence of a routing table entry that specifies reachability of an entry in the reverse routing header via the source address of the packet, the mobile router updates the reverse routing header, updates the source address field, and forwards the packet up the tree. If the determined absence is due to a routing table entry that indicates a different, non-default route than the source of the packet, the mobile router invalidates the routing table entry as invalid and obsolete. In this case, the routing table entry can be updated after the packet has been forwarded, minimizing latency.

A description will first be provided of the mobile routers configured for optimized generation and use of the reverse routing headers, followed by a description of the reverse routing header optimization.

Figure 2:
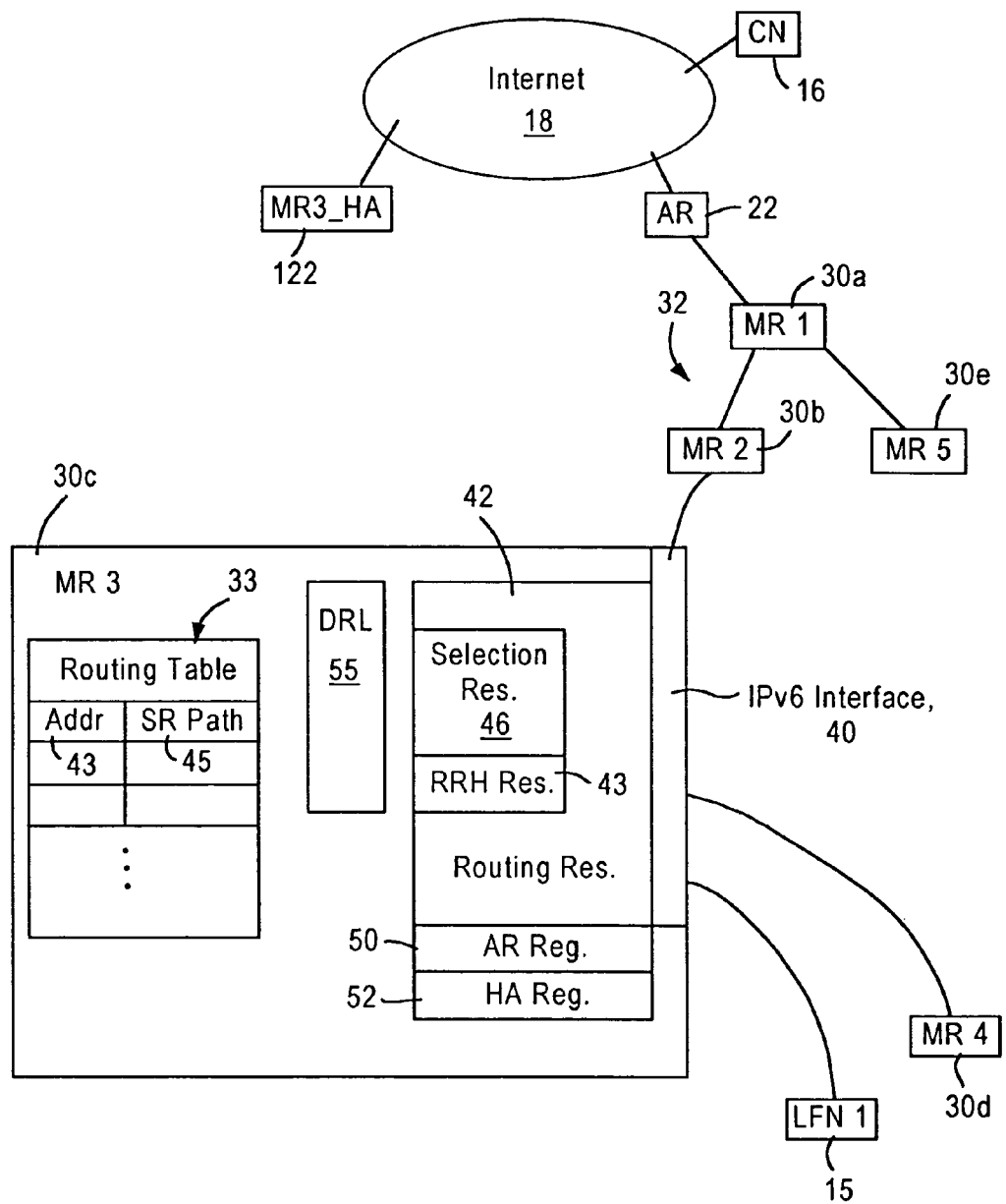
FIG. 2 is a diagram illustrating a mobile router configured for communications within a mobile network, according to an embodiment of the present invention.

FIG. 2 is a diagram illustrating in detail a mobile router 30c (MR3) configured for attaching to another mobile router 30b (MR2) in order to establish a tree-based network topology model 32. The tree-based network topology model 32 has the required characteristic that each mobile router (e.g., 30a, 30b, 30c, 30d, 30e) selects only one router as its attachment router to ensure there are no loops, ensuring a tree-type topology. The disclosed mobile routers 30 can dynamically assemble layer 2 clusters into the tree-based topology model 32 in order to optimize mobile IP operations, for example using the attachment techniques described in commonly-assigned, copending application Ser. No. 10/218,515, filed Aug. 15, 2002, entitled "ARRANGEMENT FOR OPTIMIZING CONNECTIONS BETWEEN ROAMING MOBILE ROUTERS IN A MOBILE NETWORK", the disclosure of which is incorporated in its entirety herein by reference.

According to the disclosed embodiment, the tree-based topology model 32 is organized into a cluster, where a top level mobile router (TLMR) such as the mobile router 30a (MR1), determined by having the highest relative preference values visible to other mobile routers, serves as a clusterhead (i.e., a root of a tree). Internal communications within the tree 32 may be optimized using the proactive Optimized Routing Algorithm (ORA) MANET protocol. All the non-TLMR mobile routers (e.g., 30b, 30c, 30d, and 30e) register with the TLMR 30a, enabling the TLMR to know the source route path to all the prefixes in the cluster.

As described in detail below, each mobile router "attaches" to an attachment router by selecting a default router as an attachment router, and registering with the attachment router to be a member of the tree. Various proposals have been presented to the Internet Engineering Task Force (IETF) for a mobile router to attach to a mobile network according to IPv6 protocol, including the above-incorporated Thubert et al., "IPv6 Reverse Routing Header and its Application to Mobile Networks", Jun. 19, 2002.

Each mobile router includes an IPv6 interface 40 for sending and receiving IPv6 packets, and a routing resource 42 configured for performing routing operations, including router attachment selection, router registration, bind updates, and reverse routing header processing, described below. The routing resource 42 outputs a router advertisement (RA) message 34, described with respect to FIG. 3, that enables other routers to independently determine whether to associate with (i.e., attach to) the corresponding router, also referred to as the router advertisement (RA) originator, based on the corresponding RA message. Hence, the routing resource 42 of the mobile router 30c (e.g., "MR3"), upon receiving an RA message from a router 30b or 30e, utilizes a selection resource to select whether to attach to the corresponding router advertisement originator having output the RA message based on attributes supplied by the RA message, described below. The routing resource 42 of the mobile router 30c associates with the router advertisement originator by storing the information in the RA message in its default router list 55, and selecting the source of the RA message as its attachment router; the routing resource 42 then sends a registration message to the attachment router to request it to be a member of the tree.

Router information in the internal default router list 55 is obtained using known router discovery techniques, and by detecting unsolicited router advertisement messages. The router advertisement messages may include a tree information option 66, described in the above-incorporated Thubert et al. and illustrated below with respect to FIG. 3, enabling the mobile router to store within the default router list the attributes of each detected router, as well as the attributes of the tree to which the detected router is attached.

Once the mobile router (e.g., 30c) selects a default router (e.g., 30b) to be used as an attachment router, the mobile router sends a registration request to the TLMR (e.g., 30a) via the routing protocol used inside the cluster, e.g., MANET protocol, or an extension of Mobile IP. Each mobile router (e.g., 30b, 30a) along the path to the TLMR detects the registration request from the originating mobile router (e.g., 30c), and stores in its routing table 33 the care-of address 43 of the originating mobile router (30c) and the source-route path 45 to the originating mobile router.

Hence, the TLMRs can store, within their routing tables: a default route to a wide area network (e.g., the Internet) via their attachment router (as described in the above-incorporated application Ser. No. 10/218,515); and source-route paths to the prefixes inside their cluster; and traditional routes from a standard routing protocol to the mobile networks in the connected clusters via the respective TLMRs 12a and 12b via the virtual tunnel 22.

Each router having received the registration message registers the specified mobile router 30c as a mobile router having sent the registration message and stores in its routing table 33 the address prefix 43, plus the route path 45 specified by the Source Routing.

The independent selection by each router of whether to attach to another router enables the routers to dynamically establish a tree-based network topology model, where each router may continually determine whether an alternate attachment point within the tree is preferred.

Each router (e.g., 30c) includes an IPv6 network interface 40, for example an IPv6 or mobile IPV4 network interface utilizing, for example, a wireless 802.11 link. The IP network interface 40 may include a proactive discovery resource configured, for example, for execution of MANET protocol communications within the the cluster (implemented, for example, as a MANET). Exemplary proactive MANET protocol resources that may be utilized for identifying the mobile routers include an OSPF (ver. 3) resource, configured for monitoring link connectivity information advertised by each mobile router in the MANET, and also configured for maintaining the routing table 33; another routing protocol that may be used is Source Tree Adaptive Routing (STAR) protocol, described in an Internet Draft by J. J. Garcia-Luna-Aceves et al., available from the IETF on the World Wide Web at "ietf.org/proceedings/99nov/I-D/draft-ietf-manet-star-00.txt". The routing table 33 is configured for storing IP addresses 43 of the mobile routers 12 and associated connectivity and source routing (SR) information (e.g., link state status, etc.) 45. The protocol resources also may include an Optimized Link State Routing (OLSR) Protocol resource, configured for identifying the mobile routers using hello messages and link state flooding to populate the routing table 33. Additional information regarding the MANET protocol resources is described in the Internet Draft by Baker.

The router 30c also includes an attachment router register 50 configured for specifying the IP address for a current attachment router selected by the mobile router 30c from the default router list 55. Alternatively the attachment router register 50 may specify a pointer to an entry in the default router list 55 for the selected router. The router 30c also includes a home agent register 52 for storing the address (MR3_HA) of its corresponding home agent 122.

Figure 3:
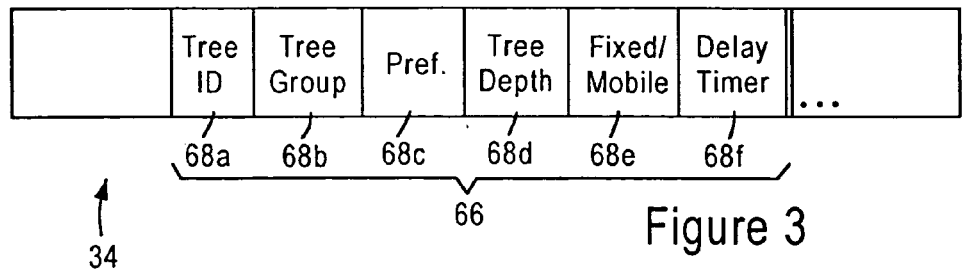
FIG. 3 is a diagram illustrating a tree information option from a received router advertisement message.

FIG. 3 is a diagram illustrating in detail a router advertisement message 34 generated by the routing resource 42, according to an embodiment of the present invention. The RA message 34 includes Router Advertisement fields as described in RFC 2461. According to the disclosed embodiment, a tree information option field 66 is added to the RA message 34 that includes attributes 68, generated by a tree information generator resource within the routing resource 42, that specify the network topology model 32 utilized by the router advertisement originator, identified by its corresponding IP source address (SA) in the IPv6 header.

For example, the tree information option field 66 includes a tree identifier 68a, a tree group identifier 68b, a preference field 68c, a tree depth field 68d, a fixed/mobile field 68e, and a delay timer field 68f. The tree identifier field 68a is configured for storing an IP address of the top level mobile router, for example an IEEE based 64-bit extended unique identifier (EUI-64) based link local address. The tree group field 68b is configured for storing a tree group identifier, for example an IPv6 address of a mobile router connected to a TLMR, enabling the selection resource 46 to distinguish between multiple tree groups (i.e., branches) within the same cluster. The preference field 68c is configured for storing a preference value for the mobile router 30c as stored in the corresponding preference register 54, enabling a mobile router receiving the RA message 34 to decide whether to associate with the source of the RA message 34.

The tree depth field 68d is configured for storing the depth of the mobile router within the tree 32, as specified by the tree information generation resource 48b, enabling other routers receiving the RA message to determine the relative position of the router advertisement originator within the tree 32. The fixed/mobile field 68e is configured for specifying whether the corresponding tree 32 is a grounded tree or a floating tree. In particular, a tree 32 is deemed to be fixed if the top level mobile router is connected to a fixed router. The delay timer field 68f is configured for storing a prescribed delay interval utilized by other routers to delay subsequent topology changes, thereby delaying propagation of subsequent RA messages in response to the RA message 34.

The tree information option (TIO) 66 also may include a path checksum field (not shown in FIG. 3), enabling a mobile router to determine whether the path through the tree above it has changed or not; in other words, a path checksum change indicates real path change. When propagating a TIO, an intermediate mobile router builds a byte string using the checksum it receives in a TIO and the 16 bytes of its care of address; the mobile router then overwrites the checksum in the TIO with the result. This operation is performed at the same time as the tree depth incrementing. The TLMR uses a checksum of zeroes for its computation.

Figure 4:
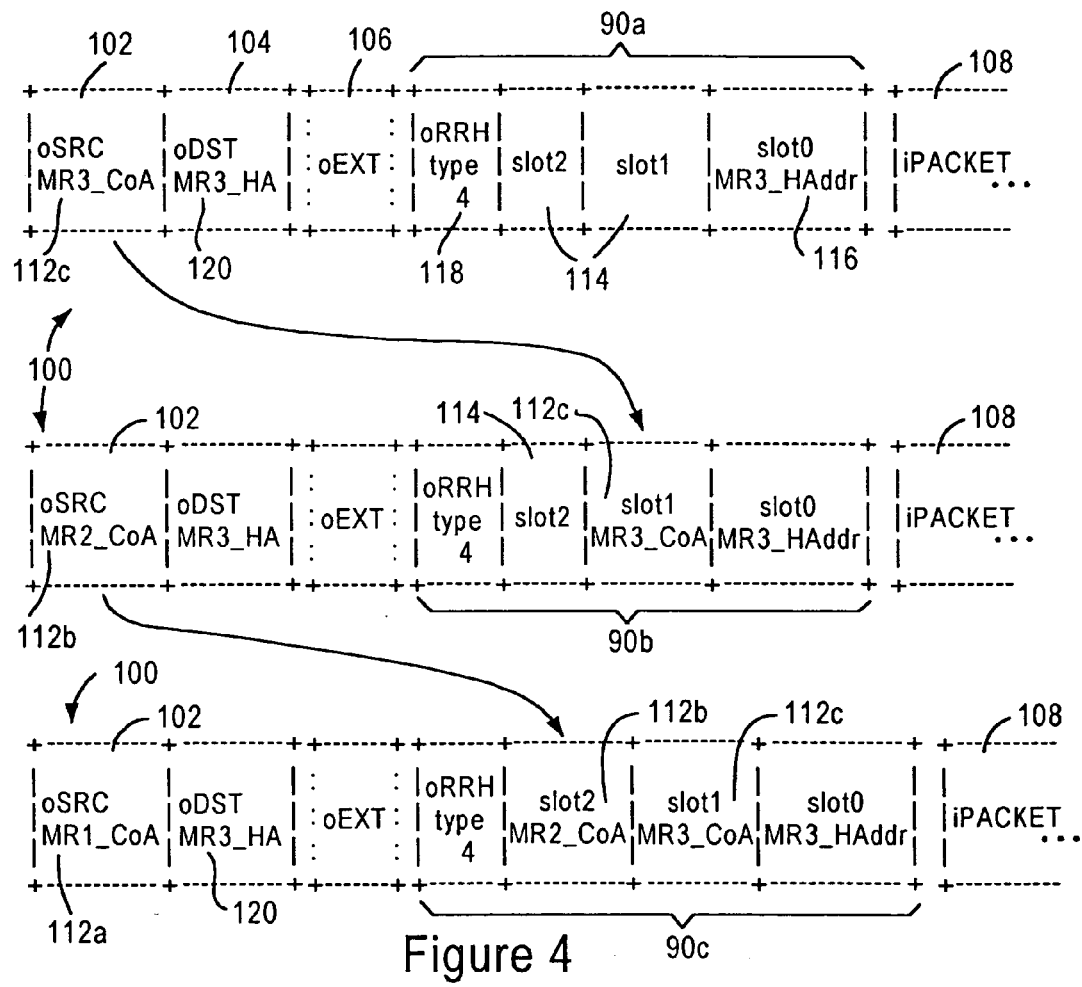
FIG. 4 is a diagram illustrating insertion of addresses within a reverse routing header.

FIG. 4 is a diagram illustrating updating of a reverse routing header 90a, 90b, and 90c by the originating mobile router 30c, the intermediate mobile router 30b, and the top level mobile router 30a, respectively. In particular, FIG. 4 illustrates a packet 100 having a source address field 102, a destination address field 104, extended headers 106, a reverse routing header (e.g., 90a) and an inner packet 108 having been generated by an originating source, for example the local fixed node of FIG. 2.

As described in the above incorporated draft by Thubert et al., the mobile router 30c, as the originating mobile router, outputs the packet 100 having the source address field 102 specifying the care of address 112c (MR3_CoA) of the mobile router 30c, and a selected number of empty address slots 114 within the reverse routing header 90a. The empty slots enable the routers 30b and 30a to store their respective care of addresses within the IPv6 header (e.g., within the reverse routing header or the source address field 102).

In particular, the routing resource 42 of the mobile router 30c has a resource 43 for generating the reverse routing header: the resource 43 inserts the prescribed home address 116 (MR3_HAddr) for the mobile router 30c in the first slot (slot0), and specifies a routing header of type "4" within a type field 118. The routing resource 42 inserts the care of address 112c of the mobile router 30c in the source address field 102, and the address 120 (MR3_HA) of the corresponding home agent 122 in the destination address field 104, and outputs the packet 100 to its attachment router 30b.

Figure 5:
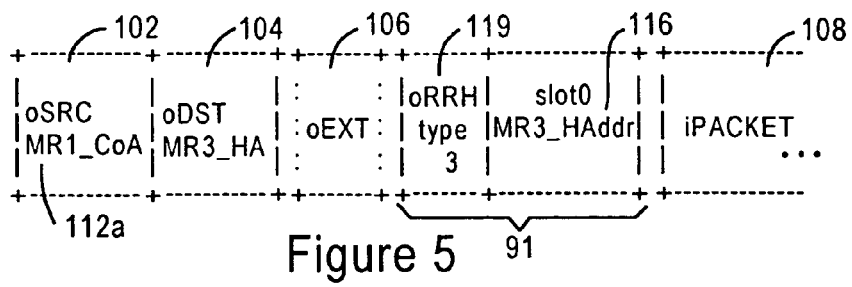
FIG. 5 is a diagram illustrating a truncated routing header according to an embodiment of the present invention.

The mobile router 30b, in response to detecting the reverse routing header 90a, selectively updates the reverse routing header by inserting the source address value 112c into the detected empty entry field "slot1", resulting in the updated reverse routing header 90b. The mobile router 30b inserts its own care of address 112b into the source address field 102, and outputs the packet to its attachment router 30a. The selective updating of the reverse routing header is described below with respect to FIGS. 5, 6, and 7.

The mobile router 30a, in response to detecting the reverse routing header 90a, selectively updates the reverse routing header by inserting the source address value 112b into the detected empty entry field "slot2", resulting in the updated reverse routing header 90a. The mobile router 30a inserts its own care of address 112a into the source address field 102, and outputs the packet to the access router 22 for delivery to the home agent 122 for the mobile router 30c, resulting in the tunnel 130 illustrated in FIG. 8. The selective updating of the reverse routing header is described below with respect to FIGS. 5, 6, and 7.

The home agent 122 reads the bottom entry to identify the home address of the mobile router 30c, using the entry as if it was a mobile IPv6 home address destination option (i.e., as an index into the binding cache). The home agent 122 now can send a packet directly back via the tunnel 130 by using the reverse routing header 90c and the source address 102 in building the routing header.

The reverse routing header 90c enables the highest resolution of updating the correspondent bind cache entry in the home agent 122. Although this arrangement may be particularly beneficial in highly mobile and nested configurations, such resolution may be unnecessary in some situations. In addition, use of the reverse routing header requires processing in all the intermediate mobile routers and in the corresponding home agent 122. In addition, the reverse routing header increases the packet size by more than the size of an IP address per hop in the mobile-network.

According to the disclosed embodiment, reverse routing header operations are optimized by both the originating mobile router 30c having initially generated the reverse routing header 90a, and by the intermediate mobile routers 30b and 30a in determining whether to update the reverse routing header 90a. The disclosed optimizing operations enable a selective reduction in the packet size to avoid wasting bandwidth, and reduction of processing requirements in intermediate routers.

In particular, if the originating mobile router 30c determines that the reverse routing header is not needed, as described below with respect to FIG. 6, the originating mobile router 30c may instead send a truncated IPv6 based routing header 91 that has a home address field 116 and none of the address slots present in the reverse routing header 90 for storage of the care of addresses for the intermediate routers. Rather, the truncated routing header 91 only includes a routing header type (type 3) field 119 and a field for the home address 116 of the mobile router 30c.

Hence, the truncated header 91 replaces the Mobile IP MIP Home Address Option and allows the home agent 122 to determine the actual source of the packet, to access the corresponding security association within its internal routing tables. In addition, an intermediate mobile router, in response to detecting the truncated header 91, is configured for automatically forwarding the packet 100 without updating the truncated header, but merely updating the source address field 102 with the corresponding care of address (e.g., 112a).

Figure 6:
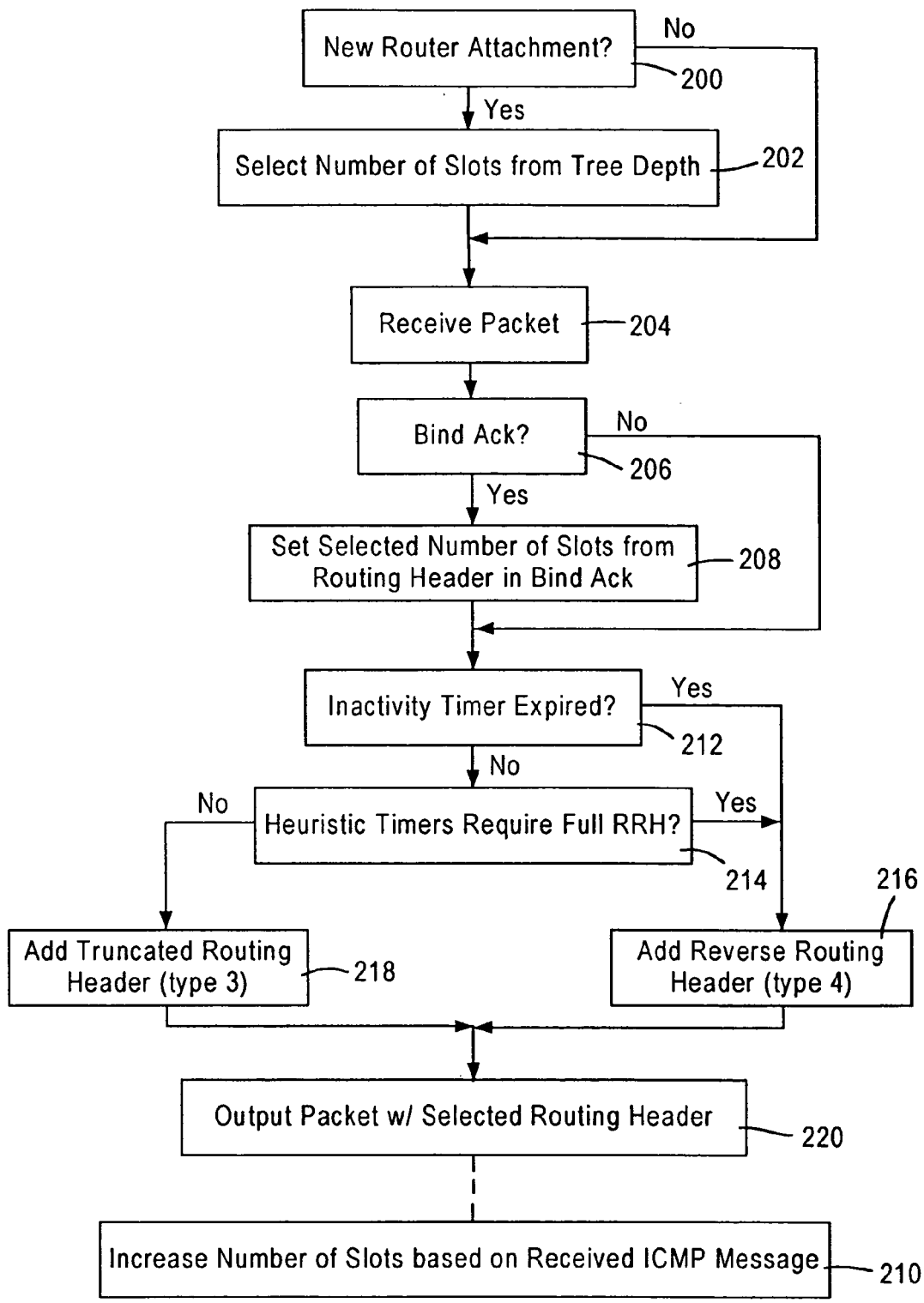
FIG. 6 is a diagram illustrating the method by an originating mobile router of selectively generating an IPv6 based reverse routing header, or a truncated IPv6 based routing header, according to an embodiment of the present invention.

FIG. 6 is a diagram illustrating the method by the routing resource 42 of the originating mobile router 30c for optimized use of the reverse routing header (RRH) 90a in establishment of the bidirectional tunnel 130, according to an embodiment of the present invention. The steps described herein with respect to FIGS. 6 and 7 can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 200, where routing resource 42 of the the originating mobile router 30c determines whether a new attachment is being made to a mobile router, for example based on detecting a change in the access router register 50. If a new router attachment is detected, indicating a change in the topology of the tree 32, the routing resource 42 selects in step 202 the number of slots needed for the reverse routing header based on the tree depth information 68d from the corresponding tree information option 66 from the corresponding router advertisement message 34.

Assume in step 204 that the mobile router receives a packet. If in step 206 the message is a bind acknowledgment from the corresponding home agent 122, the routing resource 42 sets in step 208 the selective number of slots for the reverse routing header based on the routing header in the bind acknowledgment message. Hence, the routing resource 42 can select the number of slots 114 to be used in the reverse routing header 90a based on tree depth information in step 202, or the number of slots from the routing header of any messages from the home agent 122. Note that the routing resource 42 also may increase the number of slots in step 210 in response to receiving an Internet Control Message Protocol (ICMP) message generated by an intermediate mobile router (e.g., 30b or 30a), described below with respect to FIG. 7.

The originating mobile router 30c also selects whether to add the reverse routing header 90a or the truncated header 91 for each data packet 100 output to its attachment router 30b. For example, the routing resource 42 may check in step 212 whether an inactivity timer has expired, indicating a message has not been received from the home agent 122 for a prescribed time interval. Alternately, the routing resource 42 may check in step 214 whether heuristic timers configured for monitoring the stability of the network topology model 32 indicate that a full reverse routing header 90a needs to be sent to the home agent 122. If in steps 212 or 214 the routing resource 42 determines that the type 4 reverse routing header is needed, the RRH resource 43 within the routing resource 42 generates the reverse routing header 90a in step 216, and adds the reverse routing header 90a to the packet 108. Alternately, if in step 212 or 214 the routing resource 42 determines that the type 4 reverse routing header 90a is not needed, the RRH resource 43 generates the truncated routing header 91 in step 218, and adds the truncated header 91 to the packet 108.

The packet is then output in step 220 with the selected routing header, and with the source address field 102 specifying the care of address 112c for the mobile router 30c, and the destination address field 104 specifying the home agent address 120.

Figure 7:
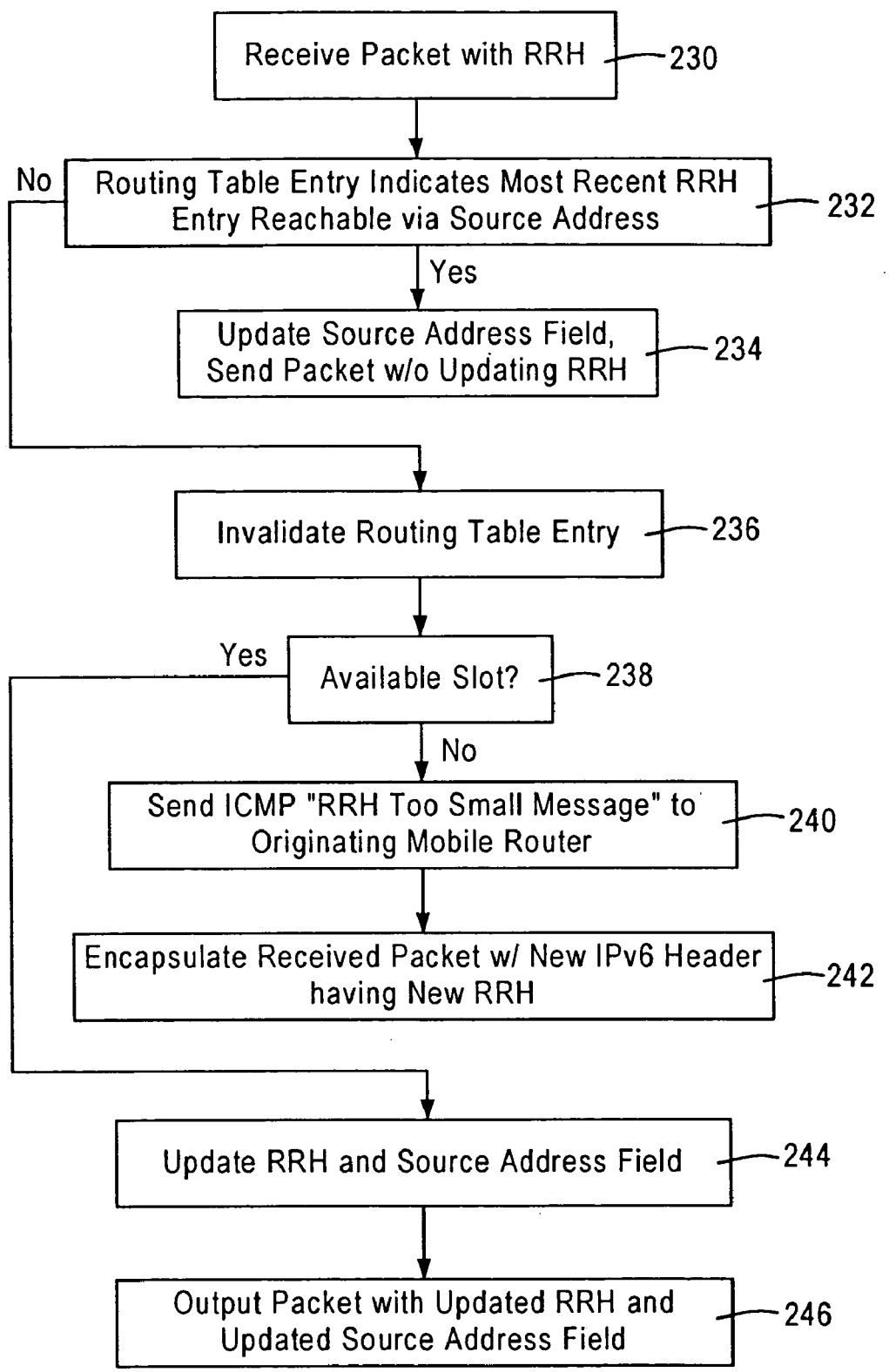
FIG. 7 is a diagram illustrating the method of by an intermediate mobile router of processing a packet having a reverse routing header, according to an embodiment of the present invention.
Figure 8:
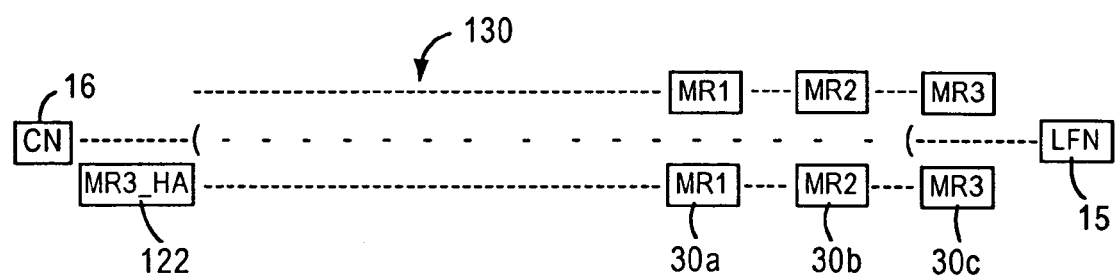
FIG. 8 is a diagram illustrating a bidirectional tunnel established between the originating mobile router and the corresponding home agent, based on the reverse routing header, according to an embodiment of the present invention.

FIG. 7 is a diagram illustrating the method by a routing resource 42 in an intermediate router (e.g., 30b or 30a) of processing a packet 100 having a reverse routing header (e.g., 90a or 90b), based on optimized processing, according to an embodiment of the present invention.

The method begins in step 230, where the IPv6 interface 40 of the intermediate router receives the packet having the reverse routing header. Note that in this example it is assumed the packet includes a reverse routing header 90, as opposed to a truncated header 91; if the intermediate router received a packet having a truncated header 91, the intermediate router would merely update the source address field with its own care of address, and forward the packet up to its corresponding attachment router.

The routing resource 42 checks in step 232 its internal routing tables 33 to determine whether updating the reverse routing header is unnecessary. In particular, if the routing resource 42 of the intermediate router (e.g., 30b) determines that use of the reverse routing header would be unnecessary due to redundant information within its internal routing tables, the updating of the reverse routing header can be avoided.

In particular, the routing resource 42 (e.g., of the mobile router 30a) determines whether the routing tables 33 includes an entry 43 with a source route path 45 indicating the most recent reverse routing header entry (e.g., MR3_CoA) is reachable via the source address (e.g., MR2_CoA) 112b specified in the source address field 102. As described above, the mobile routers should have registered with the intermediate routers using a dynamic routing protocol, enabling each mobile router to be aware via its corresponding routing tables 33 of the routes below its associated subtree to reach the lower nodes within the tree. In other words, the routing resource 42 checks whether its routing table 33 would route a packet, whose destination is the most recent entry of the reverse routing header, via the router that is the source of the packet having the RRH.

If in step 232 the routing resource 42 determines that its routing table 33 includes a table entry 43 that specifies reachability of the most recent entry within the reverse routing header via the source address value 112, then further updating of the reverse routing header is unnecessary. Hence, if further updating of the reverse routing header is unnecessary, the routing resource 42 updates the source address field 102 in step 234 with its own corresponding care of address (e.g., 112a), and outputs the packet without having updated the reverse routing header.

If in step 232 the routing resource 42 determines an absence of a routing table entry 43 that specifies reachability of the most recent entry within the reverse routing header via the source address value specified in the source address field 102, for example due to an obsolete entry, the routing resource 42 invalidates in step 236 the obsolete routing table entry.

The routing resource 42 checks in step 238 whether the reverse routing header 90 includes an empty slot 114 available for insertion of the address specified in the source address field 102. If no empty slot 114 is available, the routing resource 42 of the intermediate mobile router outputs in step 240 an ICMP message to the originating mobile router 30c specifying that the reverse routing header is too small. As described with respect to FIG. 6, the originating mobile router increases in step 210 the number of slots for subsequent RRH messages in response to the received ICMP message. Since there is no empty slot 114 available in the received packet, routing resource 42 of the intermediate router (e.g., 30b), having sent the ICMP message, encapsulates in step 242 the received packet by adding a new IPv6 header 34 having a new RRH 66 that specifies the home address 116 of the intermediate router (e.g., "MR2_HAddr"). The intermediate router then outputs in step 242 the encapsulated packet having the newly-added IPv6 header for delivery to its corresponding home agent (e.g., "MR2_HA").

If in step 238 there is an empty slot available, the routing resource 42 updates in step 244 the reverse routing header by inserting the source address value (e.g., 112b) from the source address field 102 into the next available empty slot 114, and overwriting the source address field 102 with its own corresponding care of address (e.g., 112a). The routing resource then outputs in step 246 the packet having the updated source address field 102 and the updated reverse routing header.

According to the disclosed embodiment, use of reverse routing headers is optimized in originating mobile routers, and intermediate routers, providing maximum utility of the reverse routing header while minimizing unnecessary bandwidth and processing resources within the mobile routers. Originating mobile routers can selectively generate reverse routing headers depending on the relative stability of the mobile networks, where the originating mobile routers may generate reverse routing headers more frequently within rapidly changing networks, whereas originating mobile routers may utilize the truncated header is more often in relatively stable networks, resulting in substantial bandwidth savings while maintaining reliable connections with home agents. Moreover, the disclosed optimization routines can be implemented independently in each of the mobile routers, simplifying deployment within mobile networks.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile router of a mobile network, the method including:
   receiving a packet having a source address field with a source address value specifying a source of the packet, a destination address field with a destination address value specifying a home agent for an originating mobile router, and a reverse routing header configured for storing addresses, the reverse routing header having at least a first entry that specifies a care of address for the originating mobile router;
   selectively updating the reverse routing header by inserting the source address value into a detected empty entry field of the reverse routing header, based on a determined absence of a routing table entry that specifies reachability of an identified entry within the reverse routing header via the source address value; and
   outputting the packet to an identified router, including inserting a care of address for the mobile router into the source address field.

2. The method of claim 1, further including sending to the originating mobile router a message requesting increasing the size of the reverse routing header based on a determined absence of the empty entry field.

3. The method of claim 2, wherein the sending includes generating an IPv6 header for the message that specifies a path to the originating mobile router based on the reverse routing header.

4. The method of claim 3, wherein the sending includes sending the message according to Internet Control Message Protocol (ICMP).

5. The method of claim 1, wherein the outputting includes outputting the packet, having the reverse routing header without having been updated by the mobile router, based on the determined presence of the routing table entry.

6. The method of claim 1, further including:
   detecting a second routing table entry that specifies reachability of the identified entry within the reverse routing header via a second address distinct from the source address value; and
   invalidating the second routing table entry as obsolete based on the detecting of the second address distinct from the source address value.

7. A method in a mobile router, the method including:
   attaching to a default router based on a corresponding received router advertisement message having a tree information option field having attributes specifying a network topology model of the corresponding router;
   generating an IPv6 based reverse routing header having a home address field specifying a corresponding prescribed home address for the mobile router identifiable by a prescribed home agent, and a selected number of empty address slots enabling storage of respective care-of addresses of routers between the mobile router and the prescribed home agent, the selected number determined at least based on the network topology model;
   second generating an outer IPv6 header having a source address field specifying the care-of address of the mobile router and a destination address field specifying an address of the prescribed home agent; and
   outputting a packet, including at least the outer IPv6 header and selectively including the IPv6 based reverse routing header, to the default router.

8. The method of claim 7, wherein the generating step includes selecting the selected number based on a tree depth field, specified as one of the attributes of the network topology model, that specifies a number of routers in a path between the mobile router and top level mobile router.

9. The method of claim 8, further including:
   third generating a truncated IPv6 based routing header having the home address field and none of the address slots for the storage of the respective care-of addresses of the routers between the mobile router and the prescribed home agent; and
   outputting another packet, including a selected one of the IPV6 based reverse routing header and the truncated IPv6 based routing header, based on a determined stability of the network topology model.

10. The method of claim 9, wherein the determined stability is based on expiration of an inactivity timer.

11. The method of claim 8, further comprising:
    receiving an Internet Control Message Protocol (ICMP) message specifying an insufficient number of the empty address slots;
    the selecting including increasing the selected number based on the ICMP message.

12. The method of claim 8, further comprising:
    receiving a message from the home agent having a routing header specifying the respective care of addresses for the routers between the mobile router and the prescribed home agent;
    the selecting including determining the selected number based on the routing header.

13. A mobile router configured for establishing communications within a mobile network, the mobile router including:
    an IPv6 interface configured for receiving a packet having a source address field with a source address value specifying a source of the packet, a destination address field with a destination address value specifying a home agent for an originating mobile router, and a reverse routing header configured for storing addresses, the reverse routing header having at least a first entry that specifies a care of address for the originating mobile router; and
    a routing resource configured for selectively updating the reverse routing header by inserting the source address value into a detected empty entry field of the reverse routing header, based on a determined absence of a routing table entry that specifies reachability of an identified entry within the reverse routing header via the source address value;
    the IPv6 interface configured for outputting the packet to an identified router the packet including a care of address for the mobile router having been inserted by the mobile router into the source address field.

14. The mobile router of claim 13, wherein the routing resource is configured for generating for transmission to the originating mobile router a message requesting increasing the size of the reverse routing header based on a determined absence of the empty entry field.

15. The mobile router of claim 14, wherein the routing resource is configured for generating an IPv6 header for the message that specifies a path to the originating mobile router based on the reverse routing header.

16. The mobile router of claim 15, wherein the routing resource is configured for generating the message according to Internet Control Message Protocol (ICMP).

17. The mobile router of claim 13, wherein the routing resource is configured for generating the packet, having the reverse routing header without having been updated, based on the determined presence of the routing table entry.

18. The mobile router of claim 13, wherein the routing resource is configured for:

detecting a second routing table entry that specifies reachability of the identified entry within the reverse routing header via a second address distinct from the source address value; and invalidating the second routing table entry as obsolete based on the detecting of the second address distinct from the source address value.

19. A mobile router configured for establishing communications within a mobile network, the mobile router including:

a routing resource configured for:
(1) attaching to a default router based on a corresponding received router advertisement message having a tree information option field having attributes specifying a network topology model of the corresponding router,
(2) generating an IPv6 based reverse routing header having a home address field specifying a corresponding prescribed home address for the mobile router identifiable by a prescribed home agent, and a selected number of empty address slots enabling storage of respective care-of addresses of routers between the mobile router and the prescribed home agent, the selected number determined at least based on the network topology model, and
(3) second generating an outer IPv6 header having a source address field specifying the care-of address of the mobile router and a destination address field specifying an address of the prescribed home agent; and an IPv6 interface configured for outputting to the default router a packet including at least the outer IPv6 header, the routing resource having selectively added the IPv6 based reverse routing header to the packet.

20. The mobile router of claim 19, wherein the routing resource is configured for selecting the selected number based on a tree depth field, specified as one of the attributes of the network topology model, that specifies a number of routers in a path between the mobile router and top level mobile router.

21. The mobile router of claim 20, wherein the routing resource further is configured for:

third generating a truncated IPv6 based routing header having the home address field and none of the address slots for the storage of the respective care-of addresses of the routers between the mobile router and the prescribed home agent; and selecting one of the IPv6 based reverse routing header and the truncated IPv6 based routing header for the packet, based on a determined stability of the network topology model.

22. The mobile router of claim 21, wherein the determined stability is based on expiration of an inactivity timer.

23. The mobile router of claim 20, wherein the routing resource, in response to receiving an Internet Control Message Protocol (ICMP) message specifying an insufficient number of the empty address slots, is configured for increasing the selected number based on the ICMP message.

24. The mobile router of claim 20, wherein the routing resource is configured for receiving a message from the home agent having a routing header specifying the respective care of addresses for the routers between the mobile router and the prescribed home agent, the routing resource configured for determining the selected number based on the routing header.

25. A mobile router configured for establishing communications within a mobile network, the mobile router including:

means for receiving a packet having a source address field with a source address value specifying a source of the packet, a destination address field with a destination address value specifying a home agent for an originating mobile router, and a reverse routing header configured for storing addresses, the reverse routing header having at least a first entry that specifies a care of address for the originating mobile router; and means for selectively updating the reverse routing header by inserting the source address value into a detected empty entry field of the reverse routing header, based on a determined absence of a routing table entry that specifies reachability of an identified entry within the reverse routing header via the source address value;

the means for receiving configured for outputting the packet to an identified router, the packet including a care of address for the mobile router having been inserted by the mobile router into the source address field.

26. The mobile router of claim 25, wherein the means for selectively updating is configured for generating for transmission to the originating mobile router a message requesting increasing the size of the reverse routing header based on a determined absence of the empty entry field.

27. The mobile router of claim 26, wherein the means for selectively updating is configured for generating an IPv6 header for the message that specifies a path to the originating mobile router based on the reverse routing header.

28. The mobile router of claim 27, wherein the means for selectively updating is configured for generating the message according to Internet Control Message Protocol (ICMP).

29. The mobile router of claim 25, wherein the means for selectively updating is configured for generating the packet, having the reverse routing header without having been updated, based on the determined presence of the routing table entry.

30. The mobile router of claim 25, wherein the means for selectively updating is configured for:

detecting a second routing table entry that specifies reachability of the identified entry within the reverse routing header via a second address distinct from the source address value; and invalidating the second routing table entry as obsolete based on the detecting of the second address distinct from the source address value.

31. A mobile router configured for establishing communications within a mobile network, the mobile router including:

means for attaching to a default router based on a corresponding received router advertisement message having a tree information option field having attributes specifying a network topology model of the corresponding router, the means for attaching further configured for generating an IPv6 based reverse routing header having a home address field specifying a corresponding prescribed home address for the mobile router identifiable by a prescribed home agent, and a selected number of empty address slots enabling storage of respective care-of addresses of routers between the mobile router and the prescribed home agent, the selected number determined at least based on the network topology model, the means for attaching further configured for second generating an outer IPv6 header having a source address field specifying the care-of address of the mobile router and a destination address field specifying an address of the prescribed home agent; and means for outputting to the default router a packet including at least the outer IPv6 header, the means for attaching having selectively added the IPv6 based reverse routing header to the packet.

32. The mobile router of claim 31, wherein the means for attaching is configured for selecting the selected number based on a tree depth field, specified as one of the attributes of the network topology model, that specifies a number of routers in a path between the mobile router and top level mobile router.

33. The mobile router of claim 32, wherein the means for attaching further is configured for:

third generating a truncated IPv6 based routing header having the home address field and none of the address slots for the storage of the respective care-of addresses of the routers between the mobile router and the prescribed home agent; and selecting one of the IPv6 based reverse routing header and the truncated IPv6 based routing header for the packet, based on a determined stability of the network topology model.

34. The mobile router of claim 33, wherein the determined stability is based on expiration of an inactivity timer.

35. The mobile router of claim 32, wherein the means for attaching, in response to receiving an Internet Control Message Protocol (ICMP) message specifying an insufficient number of the empty address slots, is configured for increasing the selected number based on the ICMP message.

36. The mobile router of claim 32, wherein the means for attaching is configured for receiving a message from the home agent having a routing header specifying the respective care of addresses for the routers between the mobile router and the prescribed home agent, the means for attaching configured for determining the selected number based on the routing header.

* * * * *

UNITED STATES PATENT AND TRADEMARK OFFICE
CERTIFICATE OF CORRECTION

PATENT NO. : 7,209,978 B2  Page 1 of 1
APPLICATION NO. : 10/318179
DATED : April 24, 2007
INVENTOR(S) : Thubert et al.

It is certified that error appears in the above-identified patent and that said Letters Patent is hereby corrected as shown below:

Column 14, line 48, please insert a comma after the word "router"

Signed and Sealed this

Twentieth Day of November, 2007

JON W. DUDAS
*Director of the United States Patent and Trademark Office*